United States Patent [19] [11] 3,893,953
Klein et al. [45] July 8, 1975

[54] 3-OXABICYCLO[10.3.0]PENTADECENE-(6), ITS PREPARATION AND ITS USE AS A PERFUMING AGENT

[75] Inventors: Erich Klein; Albrecht Roth, both of Holzminden, Germany

[73] Assignee: Dragoco Spezialfabrik Konz. Reich-und Aromastoffe Gerberding & Co. GmbH, Germany

[22] Filed: Dec. 28, 1973

[21] Appl. No.: 429,651

Related U.S. Application Data

[62] Division of Ser. No. 268,091, June 30, 1972, Pat. No. 3,824,258.

[30] Foreign Application Priority Data

Feb. 28, 1972   Germany............................ 2209372

[52] U.S. Cl. ................................................. 252/522
[51] Int. Cl. .......................... A61k 7/00; C11b 9/00
[58] Field of Search............... 260/346.2 R; 252/522

[56] References Cited
FOREIGN PATENTS OR APPLICATIONS
2,209,372   2/1973   Germany ........................... 252/522

*Primary Examiner*—Donald B. Moyer
*Attorney, Agent, or Firm*—Stewart and Kolasch, Ltd.

[57] ABSTRACT

The novel compound 3-oxabicyclo[10.3.0]pentadec-ene-(6) is prepared by reacting cyclododecene with paraformaldehyde in the presence of a Lewis acid as the catalyst. The product is useful as an odorant per se and in perfume compositions.

1 Claim, No Drawings

3-OXABICYCLO[10.3.0]PENTADECENE-(6), ITS PREPARATION AND ITS USE AS A PERFUMING AGENT

This application is a divisional of copending application Ser. No. 268,091, filed June 30, 1972, now U.S. Pat. No. 3,824,258, issued on July 16, 1974.

This invention relates to 3-oxabicyclo[10.3.0]pentadecene-(6) having the formula:

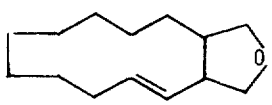

as well as to a process for the preparation thereof. The invention also relates to the use of this compound in odorant compositions.

The novel oxabicyclopentadecene compound of this invention exhibits an intensive, strongly adhering and thus long-lingering scent, reminiscent of the odor of the valuable natural musk and native storax, but additionally exhibiting a strongly wooden or ligneous odoriferous character. A considerable demand exists for such substances in the perfume industry, especially since such odoriferous materials are only available from natural sources in rather limited amounts and in strongly differing qualities.

Accordingly, one of the objects of the present invention is to provide a novel compound and compositions containing the same which have great utility in the field of odorants and perfumes.

Another object of the present invention is to provide a process for producing a novel oxabicyclopentadecene compound.

A further object of the invention is to provide a novel organic compound which is made synthetically and with consistent quality for use as a perfume in perfume compositions or as a scent-fixing and intensifying agent.

These and other objects and advantages of the present invention will become apparent to those skilled in the art from a consideration of the following specification and claims.

In accordance with the present invention, 3-oxabicyclo[10.3.0]-pentadecene-(6) is prepared from cyclododecene. The cyclododecene is obtained in a conventional manner by the dehydration of cyclododecanol. In a preferred embodiment of this invention, the cyclododecene is dissolved in glacial acetic acid and is reacted with paraformaldehyde in the presence of a Lewis acid as the catalyst. The 3-oxabicyclo[10.3.0]-pentadecene-(6) product is formed in a good yield by this procedure.

The Lewis acid used as the catalyst can be either inorganic or organic. Examples thereof include sulfuric acid, phosphoric acid, perchloric acid, zinc chloride, p-toluenesulfonic acid and benzenesulfonic acid. The concentration of catalysts employed can vary between 5 and 20 percent by weight, based upon the amount of cyclododecene utilized.

The paraformaldehyde is employed in the reaction of the present invention in an at least equimolar amount, but preferably in an excess amount.

In general, the reaction is conducted at a temperature of from about 90° to 110°C.. The amount of reaction time ranges between approximately five and seven hours, depending upon the particular catalyst employed.

The reaction of olefins in glacial acetic acid with paraformaldehyde, catalyzed by a Lewis acid, has been known for a long time in the art under the name of the "Prins Reaction"; note The Merck Index, Eighth Edition (1968), page 1204 under the heading "Organic Name Reactions," wherein it is stated that the Prins Reaction is the acid-catalyzed reaction of aldehydes with olefins to form 1,3-glycols or their derivatives. However, in this reaction, the primary reaction products are always mixtures of, in part, polyhydric alcohols, their acetates and 1,3-dioxane derivatives. Therefore, it is surprising and could not be expected that the "Prins Reaction" in the case of cyclododecene would yield an oxabicyclopentadecene compound as the main product. Apart from the unexpected course of the reaction, the conditions employed in the process of this invention correspond to the conditions customarily used in the "Prins Reaction".

As noted above, the novel oxabicyclopentadecene derivative of the present invention is especially suitable for use as a perfume material, as an odor modifier and fixative as well as for the production of perfume compositions. In this connection, a very advantageous property is the great intensity and clinging strength of the odor of this substance. Hence, the present invention also involves odorant or perfume compositions containing 3-oxabicyclo[10.3.0]pentadecene-(6) as the active component. The concentration of the novel compound of this invention in such compositions can be determined by one skilled in the perfume art in the usual manner and will depend upon the desired utility in a particular case.

The following examples are given merely as illustrative of preferred embodiments of the present invention and are not to be considered as limiting.

EXAMPLE 1

Preparation of 3-Oxabicyclo[10.3.0]pentadecene-(6)

A mixture of 1650 grams of glacial acetic acid, 100 grams of benzenesulfonic acid and 1660 grams (10 moles) of cyclododecene is introduced into an agitator and is heated to 100°C.. Within about 5 hours, 500 grams (16.7 moles) of paraformaldehyde is added batchwise under thorough agitation, the temperature being maintained at 100°C. during this procedure. The reaction mixture is further agitated at the same temperature for 2 hours, then diluted with 2 liters of water, extracted with a total of 4 liters of petroleum ether (boiling point: 60°–100°C.), and washed neutral with NaHCO$_3$ solution. After drying the reaction mixture over sodium sulfate and evaporation of the solvent under a vacuum, a yield of crude product of 2071 grams is obtained. Subsequent vacuum distillation (at 1 mm. Hg) results in the recovery of 500 grams of cyclododecene and 1070 grams of 3-oxabicyclo[10.3.0.]pentadecene-(6) as the product.

This product is a relatively viscous, colorless to slightly yellowish liquid having an intensive, pleasant scent. It exhibits a boiling point of 114°–116°C. at 1.0 mm. Hg, $n_4°^{20°}$ : 0.9705.

The NMR, IR and mass spectra are in complete conformity with the described structure.

EXAMPLE 2

A perfume composition having a flowery scent is prepared by mixing the following components in the indicated proportions:

| Components: | Parts by Weight: |
|---|---|
| Benzyl acetate | 22 |
| Hydroxycitronellal | 22 |
| Phenylethyl alcohol | 15 |
| α-Amylcinnamic aldehyde | 5 |
| Linalool | 5 |
| Dihydrojasmone | 2 |
| Ylang ylang oil | 2 |
| Methylionone | 1 |
| Geraniol | 6 |
| Eugenol | 0.4 |
| Benzyl benzoate | 3.6 |
| Benzylsalicylate | 6 |

To this mixture is added 10 parts by weight of 3-oxabicyclo[10.3.0]pentadecene-(6), whereby the scent of this composition is enhanced in a clearly noticeable manner, and the fixing and intensifying properties of this composition are considerably improved.

EXAMPLE 3

Another perfume composition is produced by mixing the following components in the proportions set forth below:

| Components: | Parts by Weight: |
|---|---|
| Dihydrocoumarin | 15 |
| Sandalwood oil, East Indian | 22 |
| Hydroxycitronellal | 22 |
| γMethylionone | 22 |
| Bergamot oil | 3 |
| Vetiveryl acetate | 2 |
| Guaiyl acetate | 4 |
| Ethyl vanillin | 0.4 |
| Patchouli oil | 0.3 |
| Citronella oil | 0.3 |

By the addition of 9 parts by weight of 3-oxabicyclo[10.3.0]Pentadecene-(6), a scent with a pronounced fine wood fragrance characteristic is imparted to this matter.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:
1. A perfume composition comprising an odor-imparting amount of 3-oxabicyclo[10.3.0]-pentadecene-(6) of the formula:

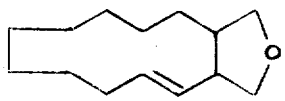

and at least one additional scenting agent.